United States Patent
Broussard (10) Patent No.: US 11,991,987 B1
(45) Date of Patent: May 28, 2024

(54) PORTABLE APPARATUS FOR DISPENSING BAGS AND STORING PET WASTE FOR DISPOSAL

(71) Applicant: Linda Broussard, Rocklin, CA (US)

(72) Inventor: Linda Broussard, Rocklin, CA (US)

(*) Notice: Subject to any disclaimer, the term of this patent is extended or adjusted under 35 U.S.C. 154(b) by 347 days.

(21) Appl. No.: 17/399,155

(22) Filed: Aug. 11, 2021

Related U.S. Application Data (60) Provisional application No. 63/228,000, filed on Jul. 30, 2021.

(51) Int. Cl.
*B65H 16/00* (2006.01)
*A01K 23/00* (2006.01)

(52) U.S. Cl.
CPC ......... *A01K 23/005* (2013.01); *B65H 16/005* (2013.01); *B65H 2701/191* (2013.01)

(58) Field of Classification Search
CPC ................ A01K 23/005; E01H 1/1206; E01H 2001/126; E01H 2001/1286; B65H 16/005; B65H 2701/191
See application file for complete search history.

(56) References Cited

U.S. PATENT DOCUMENTS

| | | |
|---|---|---|
| 4,978,095 A | 12/1990 | Phillips |
| 6,240,881 B1 | 6/2001 | Edwards |
| 8,720,384 B2 | 5/2014 | Gee |
| 9,220,379 B2 | 12/2015 | Winestock |
| 9,491,932 B1 | 11/2016 | Becattini, Jr. |
| 11,598,060 B1 * | 3/2023 | Broussard ............. E01H 1/1206 |
| 2008/0223868 A1 | 9/2008 | Sawin |
| 2011/0284544 A1 * | 11/2011 | Davies .................. B65F 1/1615 220/315 |
| 2012/0286003 A1 | 11/2012 | Shadday |
| 2019/0228753 A1 * | 7/2019 | Wheeler ................ G10G 7/005 |

FOREIGN PATENT DOCUMENTS

| | | | |
|---|---|---|---|
| GB | 2458458 | 9/2009 | |
| GB | 2540978 | 8/2015 | |
| GB | 2540978 A | * 2/2017 | ........... A01K 23/005 |

OTHER PUBLICATIONS

Baxterboo, "Flexi Multi Box for Flexi Rectractable Dog Leash—Black, IB# 101496", downloaded on Aug. 9, 2021 from https://www.baxterboo.com/p.cfm/flexi-multi-box-for-flexi-retractable-dog-leash-black/, 5 pages.

Happy Dog Home Boarding, "Dog Blog, PoopPot—Product Review", Apr. 21, 2017, downloaded on Aug. 9, 2021 from https://www.happyhomedogboarding.com/blog/pooppot-product-review, 20 pages.

Kickstarter, "PoopPot—A dog owners best friend", Feb. 12, 2017, downloaded on Aug. 2, 2021 from https://www.kickstarter.com/projects/1131520809/pooppot-a-dog-owners-best-friend?ref=discovery&term=dog%20poop, 7 pages.

* cited by examiner

*Primary Examiner* — Javier A Pagan
(74) *Attorney, Agent, or Firm* — O'BANION & RITCHEY LLP; John P. O'Banion (57) ABSTRACT

A portable pet waste collection device which overcomes issues involved with collecting and carrying pet waste when a refuse container is not close by. An expandable waste container is coupled to a bag dispenser from which a user obtains a bag prior to collection. The waste container can be kept in a collapsed state prior to collection, and expanded for receiving a bag of waste. The device conveniently retains the waste bags until proper disposal facilities are available.

19 Claims, 4 Drawing Sheets

PORTABLE APPARATUS FOR DISPENSING BAGS AND STORING PET WASTE FOR DISPOSAL

CROSS-REFERENCE TO RELATED APPLICATIONS

This application claims priority to, and the benefit of, U.S. provisional patent application Ser. No. 63/228,000 filed on Jul. 30, 2021, incorporated herein by reference in its entirety.

STATEMENT REGARDING FEDERALLY SPONSORED RESEARCH OR DEVELOPMENT

Not Applicable

INCORPORATION-BY-REFERENCE OF COMPUTER PROGRAM APPENDIX

Not Applicable

NOTICE OF MATERIAL SUBJECT TO COPYRIGHT PROTECTION

A portion of the material in this patent document may be subject to copyright protection under the copyright laws of the United States and of other countries. The owner of the copyright rights has no objection to the facsimile reproduction by anyone of the patent document or the patent disclosure, as it appears in the United States Patent and Trademark Office publicly available file or records, but otherwise reserves all copyright rights whatsoever. The copyright owner does not hereby waive any of its rights to have this patent document maintained in secrecy, including without limitation its rights pursuant to 37 C.F.R. § 1.14.

BACKGROUND

1. Technical Field

The technology of this disclosure pertains generally to pet waste management, and more particularly to dispensing bags and storing pet waste for disposal.

2. Background Discussion

Hand carrying bags containing pet waste (e.g., dog poop) is both unsanitary and unseemly (e.g., awkward and smelly), while doing so generally renders various normal hand actions infeasible, such as for example, blowing your nose, adjusting your glasses, answering your phone, holding your child's hand, eating a quick snack, and taking a drink of water or coffee. None of those actions seem appropriate or desirable while holding a bag filled with dog excrement. Further, there might be times when walking a trail or beach where garbage receptacles are not readily available and it is undesirable to leave the mess on the ground or hold a bag of excrement for an extended walk of a mile or two.

Accordingly, a need exists for a simple system which frees ones hands and makes the whole process less objectionable. The present disclosure fulfills that need and provides additional benefits over previous technologies.

BRIEF SUMMARY

A small, portable and convenient apparatus is described that solves many issues associated with carrying filled pet waste bags when a suitable garbage (refuse) container is not readily available.

In one embodiment the apparatus comprises an upper container and a lower container. The upper container is configured for storing a roll of pet waste bags and dispensing individual bags from the roll. The lower container is configured for storing dispensed bags after they have been filed with pet waste, and can be expanded when more room is needed and collapsed flat to keep it out of the way when it is not being used. In one embodiment the entire apparatus when collapsed is not much taller than a roll of these collection bags.

In one embodiment, the upper and lower containers are hinged and held closed by a magnetic clasp. The apparatus is easy to open by pivoting the upper container up and away from the lower container thereby allowing filled bags to be deposited into the lower container through a wide mouth opening.

In at least one embodiment an attachment structure is incorporated, such as a small ring tab, for attaching the apparatus to a leash, purse, backpack, stroller, or any place one would prefer to hang the apparatus. In at least one embodiment the attachment is facilitated using a carabiner or similar coupling link.

Further aspects of the technology described herein will be brought out in the following portions of the specification, wherein the detailed description is for the purpose of fully disclosing preferred embodiments of the technology without placing limitations thereon.

BRIEF DESCRIPTION OF THE SEVERAL VIEWS OF THE DRAWING(S)

The technology described herein will be more fully understood by reference to the following drawings which are for illustrative purposes only.

DETAILED DESCRIPTION

FIG. 1 through FIG. 6 illustrate a non-limiting embodiment of a portable apparatus for dispensing bags and storing pet waste for disposal according to the present disclosure.

In one embodiment the apparatus comprises a bag dispenser and a waste container coupled to the bag dispenser. The bag dispenser is configured for storing a roll of pet waste bags and dispensing individual bags from the roll. The waste container is configured for storing dispensed bags after they have been filed with pet waste. The waste container can be expanded and collapsed, and would generally be carried in a collapsed position until pet waste is collected. The waste container is then expanded to create an interior space for holding bags filled with pet waste.

In use, a bag is dispensed from the bag dispenser for waste collection. After waste collection, the top of the bag is tied off, the waste container is opened, the bag containing pet waste is deposited into the waste container, and the waste container is closed.

Figure 1:
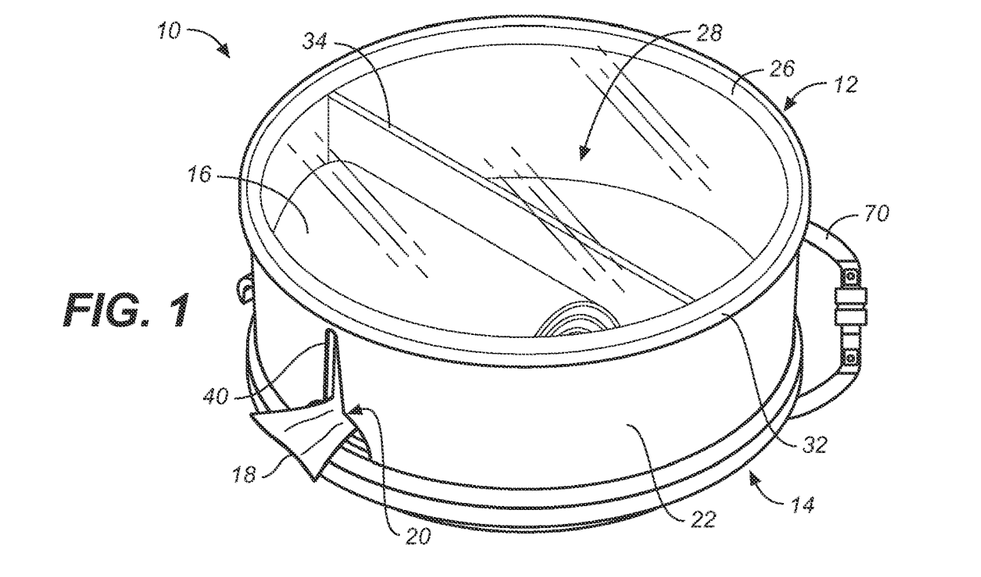
FIG. 1 is a perspective view of an embodiment of a portable apparatus for dispensing bags and storing pet waste for disposal shown in a collapsed configuration and with the lid for the bag dispenser removed.
Figure 2:
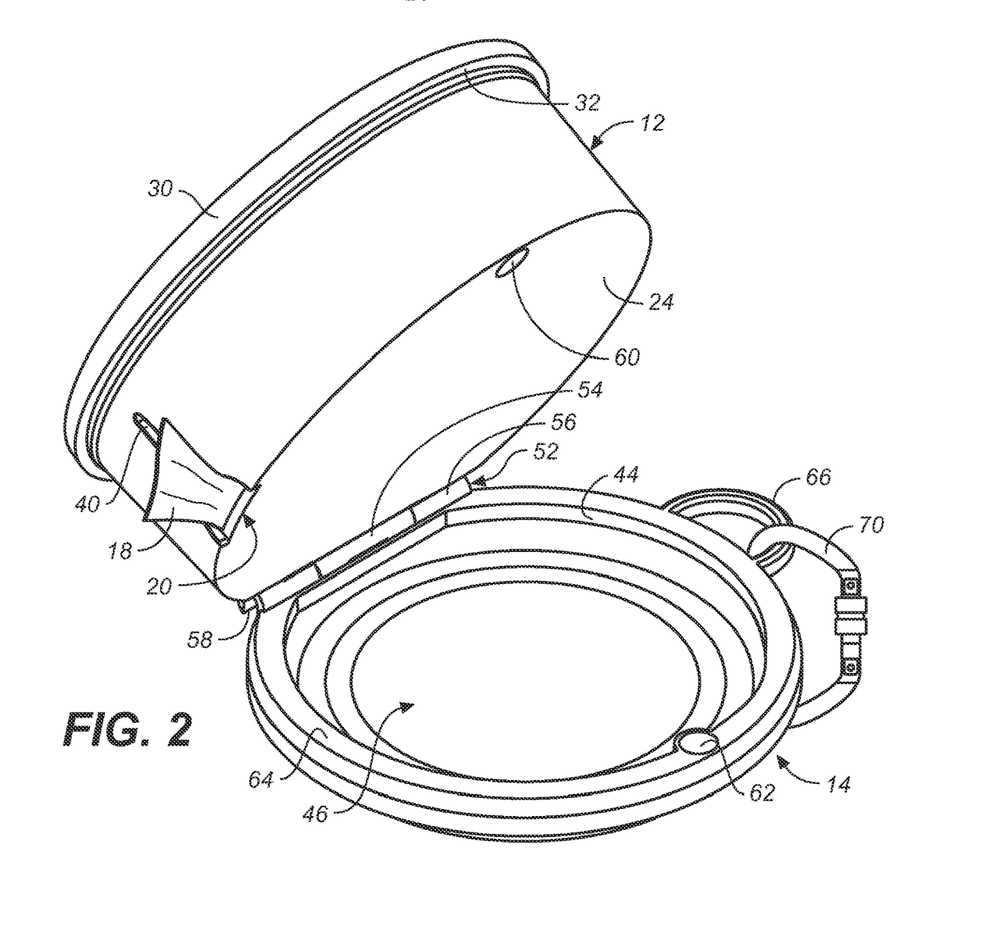
FIG. 2 is a perspective view of the apparatus showing the bag dispenser moved away from and exposing the interior space of the waste container.

Referring to FIG. 1 and FIG. 2, a preferred embodiment of the apparatus 10 is shown in a collapsed position. In the embodiment shown, the apparatus comprises a first container 12 (bag dispenser) and a second container 14 (waste container).

The bag dispenser 12 is configured for storing a roll of pet waste (e.g., dog poop) bags 16 and dispensing individual bags 18 from the roll through an opening 20 in the sidewall 22 of the bag dispenser 12.

In one embodiment, the bag dispenser 12 includes a closed bottom 24, an open top 26, and an interior space 28. In one embodiment, a lid is 30 provided to cover the open top of the bag dispenser 12 for retaining items therein. In one embodiment, the lid 30 fits over a lip 32 that encircles the edge of the open top 26 and snaps onto the bag dispenser 12. The lid 30 could alternatively be coupled to the bag dispenser 12 using hinges or other means for controlling access to the interior space 28 of the bag dispenser 12.

In one embodiment, the interior space 28 of the bag dispenser 12 is separated into a plurality of sections by a dividing wall 34. In one embodiment, the dividing wall 34 forms a compartment 36 into which a roll of pet waste bags 16 can be placed and a compartment 38 that can be used for holding items such keys, air freshener, hand sanitizer, food, a spare roll of bags, etc.

In at least one embodiment the bottom 24 of the bag dispenser 12 can be configured with a structure for retaining an air freshener, such as in a stick-on, packet or bead form, so that fresh smelling air is available when the waste container 14 is opened.

Figure 3:
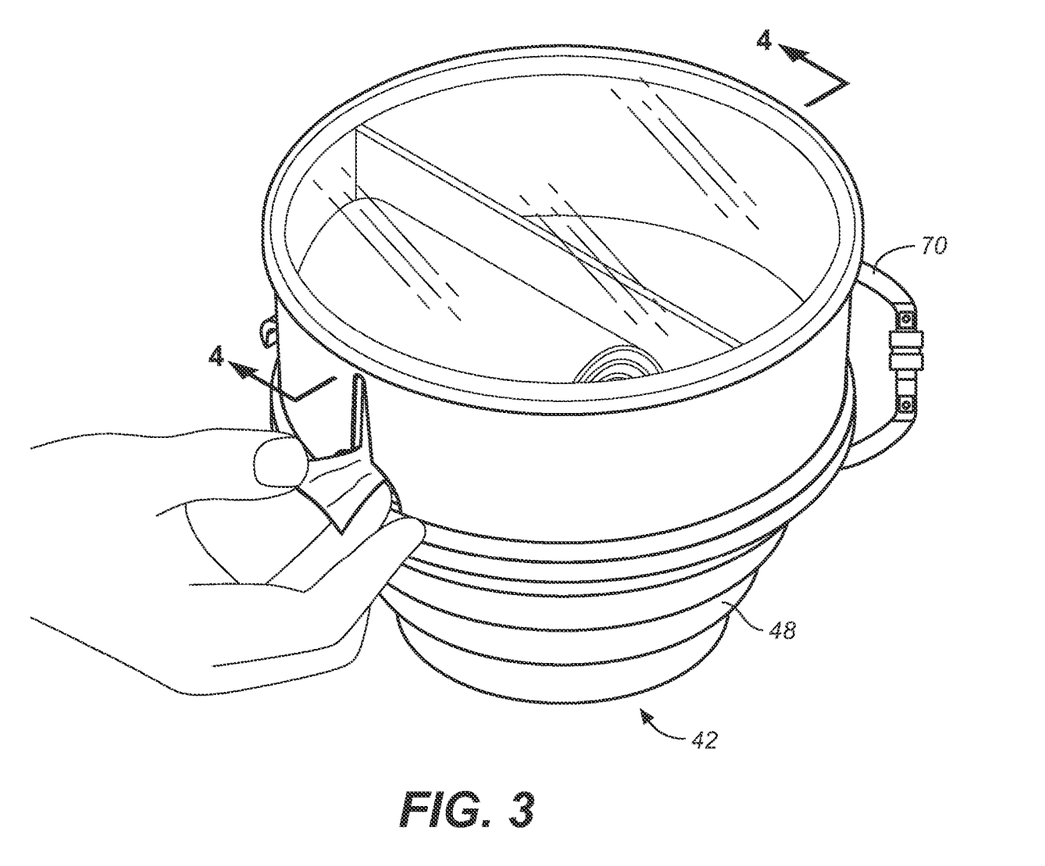
FIG. 3 is a perspective view of the apparatus showing the waste container in an expanded position, the bag dispenser covering the interior space of the waste container, and a pet waste bag being dispensed through an opening in the sidewall of the bag dispenser.
Figure 4:
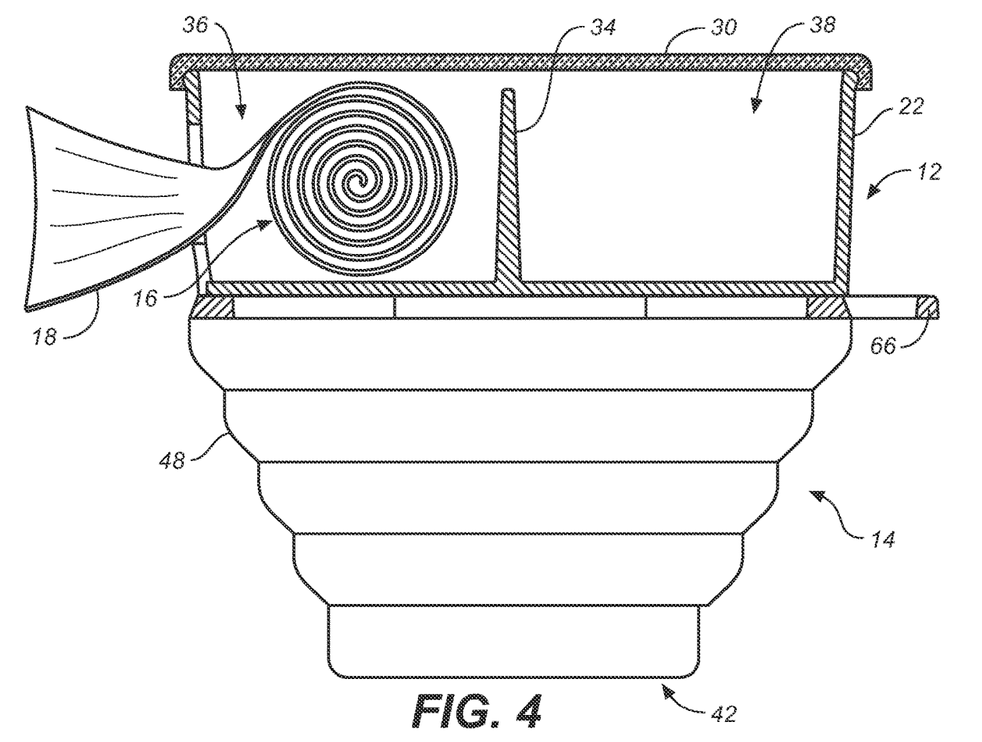
FIG. 4 is a cross-section view of bag dispenser portion of the apparatus taken through lines 4-4 of FIG. 3.

Preferably the roll of pet waste bags comprises a plurality of bags with perforations therebetween to simplify separation. Accordingly, in one embodiment the opening 20 in the sidewall 22 of the bag dispenser 12 has an inverted "T" shape with a tapered leg 40. The "T"-shaped opening is configured to allow a user to pull a bag 18 to be dispensed through the opening 20, use the tapered leg 40 to engage an adjacent bag in the roll (the next bag to be dispensed), and separate the bag being dispensed from the adjacent bag in the roll.

As previously described, the waste container 14 is configured for storing dispensed bags after they have been filed with pet waste. Referring also to FIG. 3, in one embodiment the waste container 14 has a closed bottom portion 42, an open top 44, a resizable interior space 46, and a flexible sidewall 48. The sidewall 48 has a nesting accordion-style configuration that allows the waste container 14 to be reconfigured between an expanded position when room is needed for storing bags filled with pet waste (see FIG. 3, FIG. 4, and FIG. 6) and a collapsed position to keep it out of the way when it is not being used (see FIG. 1 and FIG. 2). In one embodiment the entire apparatus when collapsed is not much taller than a roll of the pet waste bags.

By pushing on the bottom portion 42 of the waste container 14 from the interior space 46, or by pulling on bottom portion 42 from the exterior of waste container 14, the user 50 can expand the waste container 14 as shown in FIG. 3. It should be noted that in at least one embodiment the apparatus can be expanded from a collapsed state through at least one intermediate state of expansion to a state of full expansion, thus allowing the apparatus to be kept as small as practical for the amount of waste it retains. The user reversibly can collapse the waste container 14 to its original collapsed configuration as shown in FIG. 2. To facilitate such expansion and collapsing of the waste container 14, in at least one embodiment the waste container 14 is preferably formed from a flexible material such as from a synthetic or natural polymeric material (i.e., elastomeric materials, latex, silicon, certain thermoplastics, rubber, and so forth) that is sufficiently resilient to withstand collapsing and expanding the waste container 14 through numerous duty cycles without breaking.

In one embodiment the bag dispenser 12 is coupled to the waste container 14 such that the waste container can be opened for inserting bags filled with pet waste and then closed. Accordingly, the bag dispenser 12 functions to cover and close the waste container 14. In one embodiment, the bag dispenser 12 and waste container 14 are coupled by means of a hinge assembly 52 that permits the bag dispenser 12 to swing up and away from the waste container 14, thereby exposing the open top of the lower container. In one embodiment, the hinge assembly 42 comprises a conventional assembly of a first hinge section 54 on bag dispenser 12 and a second hinge section 56 on waste container 14 that are held in a pivotal relationship by a pin 58. Preferably the respective hinge sections are integrally molded as parts of the bag dispenser 12 and the waste container 14 so as to form an integral connection. Other hinge types known to those skilled in the art can be used as well. Other coupling means could be used as well, such as threads, snap-fit connections, etc. The coupling means should be flexible and sufficiently resilient to withstand repeated opening and closing of the apparatus without breaking.

In one embodiment, magnets (not shown) are used as clasps to hold the bag dispenser 12 and the waste container 14 in a closed position. The magnets are preferably recessed in holes 60, 62 that are provided in the upper and lower containers. Other types of clasps could be used as well, such as snaps, latches, etc.

Figure 5:
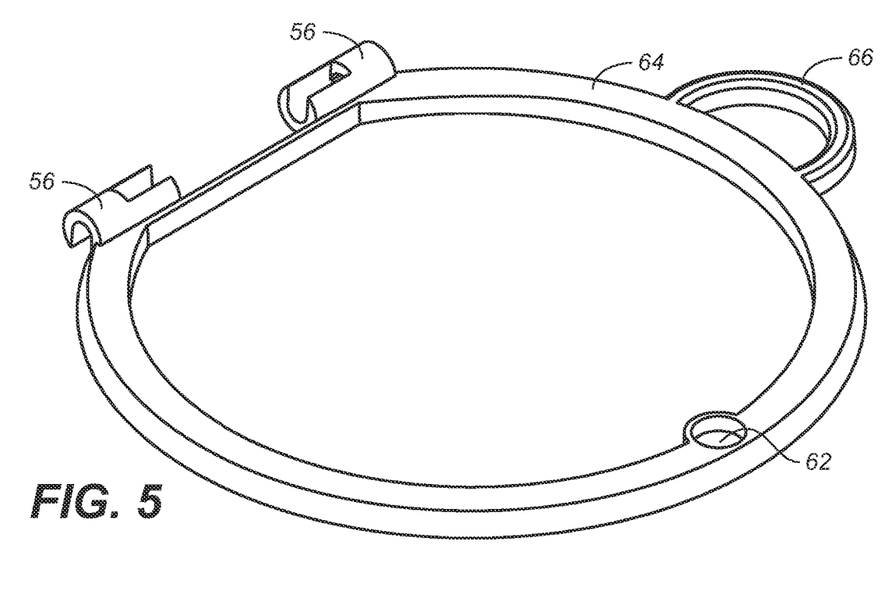
FIG. 5 is a perspective view of a retaining ring for attachment to the waste container and shows a portion of a hinge, a ring tab, and hole for recessing a magnet according to an embodiment of the apparatus

Referring also to FIG. 5 in one embodiment a retaining ring 64 is provided that reinforces the upper edge of the waste container 14. The retaining ring 64 also carries hinge portion 56 and hole 62 for one of the recessed magnets described above, or other coupling and clasping components. In one embodiment, the retaining ring 64 is glued to the upper edge of the waste container 14. In one embodiment, the retaining ring 64 and upper edge of the waste container 14 are configured to securely snap together. In one embodiment, the retaining ring 64 includes a plurality of hooks (not shown) that snap over a lip (not shown) on the upper edge of the waste container 14.

Figure 6:
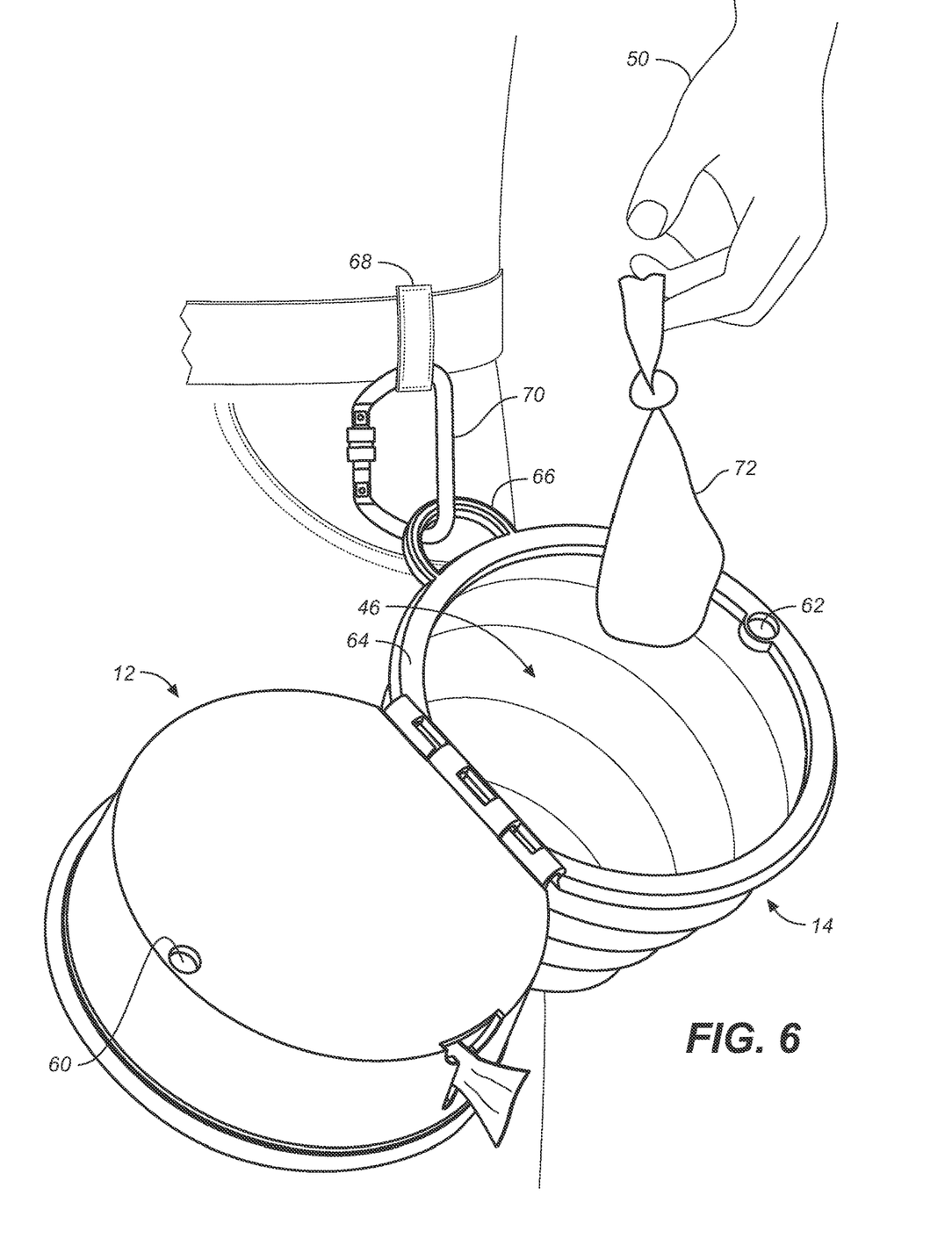
FIG. 6 is a perspective view showing the apparatus attached to a belt loop, the waste container fully open, and a user depositing a filled bag into the waste container.

In one embodiment the retaining ring 64 includes an attachment structure, such as a small ring tab 66, for attaching the apparatus to a belt loop 68 as shown in FIG. 6, or to a leash, purse, backpack, stroller, or other object on which the user desires to hang the apparatus. In one embodiment the attachment is facilitated using a carabiner 70 or similar coupling link. Also, as illustrated in FIG. 6, when the waste container 14 is attached to an object using the ring tab 66, the waste container 14 will be positioned such that when the bag dispenser 12 is opened, it will stay open from gravity, allowing more convenient access to the interior space 46 of the waste container 14 into which the user 50 is depositing a filled pet waste bag 72.

In the embodiments illustrated the apparatus has a preferred tapering cylindrical shape. It will be appreciated, however, that the apparatus can be configured in other shapes and sizes without departing from the teachings of the present disclosure.

Accordingly it can be seen that the apparatus solves problems associated with carrying filled pet waste bags when a suitable garbage container is not available. Carrying pet waste bags by hand is unsanitary and smelly, and also makes various normal hand actions infeasible and undesirable while holding a bag filled with pet waste. Further, there can be times while walking on a trail or beach where garbage receptacles are not available and it is undesirable hold a pet waste bag for a mile or two. The apparatus described in this disclosure solves those problems in a small, portable form factor. The ability of the apparatus to be collapsed flat and the fact that it replaces a pet owner's current pet waste bag holder make it a discreet, convenient, all-in-one solution for a dog walker or other pet owner.

The apparatus could also be utilized by anyone needing a place to hold small items to be thrown away when a garbage container is located. Examples where this would be handy are such as on a hike with a backpack, in the car on a road trip, on a fishing boat, on a walk with a baby stroller, or similar scenarios.

From the description herein, it will be appreciated that the present disclosure encompasses multiple implementations of the technology which include, but are not limited to, the following:

1. An apparatus for dispensing bags and storing waste for disposal, the apparatus comprising: a first, expandable container; a second container coupled to the first container by a hinge, wherein said second container functions as a lid for the first container, and wherein said second container can be moved between a first position wherein said first container is closed and a second position wherein said first container is open; a magnetic closure coupling said first container and said second container and configured for retaining said first container and said second container in a closed position; an opening in a sidewall of the second container; a compartment in the second container configured to retain a perforated roll of bags; a lid configured to snap on and off of the second container for opening and closing the second container; wherein the opening in the sidewall of the second container is configured for bags in the perforated roll of bags to be threaded through the opening in the sidewall of the second container and then separated from the perforated roll of bags for dispensing; wherein said first container is reconfigurable between a collapsed position and an expanded position; and wherein said expanded position of said first container is configured to hold one or more of said bags filled with a material for later disposal.

2. The apparatus of any preceding or following implementation, wherein said first container comprises a flexible material of sufficient resiliency to withstand collapsing and expanding the first container through numerous duty cycles.

3. The apparatus of any preceding or following implementation, wherein said flexible material comprises a synthetic or natural polymeric material.

4. The apparatus of any preceding or following implementation, wherein said polymeric material is selected from the group of polymeric materials consisting of elastomeric materials, latex, silicon, thermoplastics, and rubber.

5. The apparatus of any preceding or following implementation, wherein said first container comprises multiple sections that form an accordion-like expandable and collapsible structure.

6. The apparatus of any preceding or following implementation, wherein said first container includes a retention ring having at least one hinge for coupling to at least one hinge on the second container.

7. The apparatus of any preceding or following implementation, wherein said retention ring includes a ring tab configured for engaging a removable fastener for attaching said apparatus to an object when carrying said apparatus.

8. The apparatus of any preceding or following implementation, wherein said second container includes a second compartment configured for storing an object.

9. An apparatus for dispensing bags and storing waste for disposal, the apparatus comprising: a bag dispenser; a waste container coupled to said bag dispenser; wherein said bag dispenser functions as a lid for the waste container, and wherein said bag dispenser can be moved between a first position wherein said waste container is closed and a second position wherein said waste container is open; an opening in a sidewall of the bag dispenser; a compartment in the bag dispenser configured to retain a perforated roll of bags; wherein the opening in the sidewall of the bag dispenser is configured for bags in the perforated roll of bags to be threaded through the opening in the sidewall of the bag dispenser and then separated from the perforated roll of bags for dispensing; wherein said waste container is reconfigurable between a collapsed position and an expanded position; and wherein said expanded position of said waste container is configured to hold one or more of said bags filled with a material for later disposal.

10. The apparatus of any preceding or following implementation, wherein said waste container comprises a flexible material of sufficient resiliency to withstand collapsing and expanding the first container through numerous duty cycles.

11. The apparatus of any preceding or following implementation, wherein said flexible material comprises a synthetic or natural polymeric material.

12. The apparatus of any preceding or following implementation, wherein said polymeric material is selected from the group of polymeric materials consisting of elastomeric materials, latex, silicon, thermoplastics, and rubber.

13. The apparatus of any preceding or following implementation, further comprising a magnetic closure coupling said bag dispenser and said waste container and configured for retaining said bag dispenser and said waste container in a closed position.

14. The apparatus of any preceding or following implementation, wherein said waste container comprises multiple sections that form an accordion-like expandable and collapsible structure.

15. The apparatus of any preceding or following implementation, wherein said waste container includes a retention ring having at least one hinge for coupling to at least one hinge on the bag dispenser.

16. The apparatus of any preceding or following implementation, wherein said retention ring includes a ring tab configured for engaging a removable fastener for attaching said apparatus to an object when carrying said apparatus.

17. The apparatus of any preceding or following implementation, further comprising a lid configured to snap on and off of the bag dispenser for opening and closing the bag dispenser.

18. The apparatus of any preceding or following implementation, wherein said bag dispenser container includes a second compartment configured for storing an object.

19. An apparatus for dispensing bags and storing waste for disposal, the apparatus comprising: a first, expandable container; a second container coupled to the first container by a hinge, wherein said second container functions as a lid for the first container, and wherein said second container can be moved between a first position wherein said first container is closed and a second position wherein said first container is open; a magnetic closure coupling said first container and said second container and configured for retaining said first container and said second container in a closed position; an opening in a sidewall of the second container; a first compartment in the second container configured to retain a perforated roll of bags; a second compartment in the second container configured for storing an object; a lid configured to snap on and off of the second container for opening and closing the second container; wherein the opening in the sidewall of the second container is configured for bags in the perforated roll of bags to be threaded through the opening in the sidewall of the second container and then separated from the perforated roll of bags for dispensing; wherein said first container is reconfigurable between a collapsed position and an expanded position; wherein said first container comprises multiple sections that form an accordion-like expandable and collapsible structure; wherein said expanded position of said first container is configured to hold one or more of said bags filled with a material for later disposal; wherein said first container includes a retention ring having at least one hinge for coupling to at least one hinge on the second container; and wherein said retention ring includes a ring tab configured for engaging a removable fastener for attaching said apparatus to an object when carrying said apparatus.

As used herein, term "implementation" is intended to include, without limitation, embodiments, examples, or other forms of practicing the technology described herein.

As used herein, the singular terms "a," "an," and "the" may include plural referents unless the context clearly dictates otherwise. Reference to an object in the singular is not intended to mean "one and only one" unless explicitly so stated, but rather "one or more."

Phrasing constructs, such as "A, B and/or C", within the present disclosure describe where either A, B, or C can be present, or any combination of items A, B and C. Phrasing constructs indicating, such as "at least one of" followed by listing a group of elements, indicates that at least one of these group elements is present, which includes any possible combination of the listed elements as applicable.

References in this disclosure referring to "an embodiment", "at least one embodiment" or similar embodiment wording indicates that a particular feature, structure, or characteristic described in connection with a described embodiment is included in at least one embodiment of the present disclosure. Thus, these various embodiment phrases are not necessarily all referring to the same embodiment, or to a specific embodiment which differs from all the other embodiments being described. The embodiment phrasing should be construed to mean that the particular features, structures, or characteristics of a given embodiment may be combined in any suitable manner in one or more embodiments of the disclosed apparatus, system or method.

As used herein, the term "set" refers to a collection of one or more objects. Thus, for example, a set of objects can include a single object or multiple objects.

Relational terms such as first and second, top and bottom, upper and lower, left and right, and the like may be used solely to distinguish one entity or action from another entity or action without necessarily requiring or implying any actual such relationship or order between such entities or actions.

The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element.

As used herein, the terms "approximately", "approximate", "substantially", "essentially", and "about", or any other version thereof, are used to describe and account for small variations. When used in conjunction with an event or circumstance, the terms can refer to instances in which the event or circumstance occurs precisely as well as instances in which the event or circumstance occurs to a close approximation. When used in conjunction with a numerical value, the terms can refer to a range of variation of less than or equal to ±10% of that numerical value, such as less than or equal to ±5%, less than or equal to ±4%, less than or equal to ±3%, less than or equal to ±2%, less than or equal to ±1%, less than or equal to ±0.5%, less than or equal to ±0.1%, or less than or equal to ±0.05%. For example, "substantially" aligned can refer to a range of angular variation of less than or equal to ±10°, such as less than or equal to ±5°, less than or equal to ±4°, less than or equal to ±3°, less than or equal to ±2°, less than or equal to ±1°, less than or equal to ±0.5°, less than or equal to ±0.1°, or less than or equal to ±0.05°.

Additionally, amounts, ratios, and other numerical values may sometimes be presented herein in a range format. It is to be understood that such range format is used for convenience and brevity and should be understood flexibly to include numerical values explicitly specified as limits of a range, but also to include all individual numerical values or sub-ranges encompassed within that range as if each numerical value and sub-range is explicitly specified. For example, a ratio in the range of about 1 to about 200 should be understood to include the explicitly recited limits of about 1 and about 200, but also to include individual ratios such as about 2, about 3, and about 4, and sub-ranges such as about 10 to about 50, about 20 to about 100, and so forth.

The term "coupled" as used herein is defined as connected, although not necessarily directly and not necessarily mechanically. A device or structure that is "configured" in a certain way is configured in at least that way, but may also be configured in ways that are not listed.

Benefits, advantages, solutions to problems, and any element(s) that may cause any benefit, advantage, or solution to occur or become more pronounced are not to be construed as a critical, required, or essential features or elements of the technology describes herein or any or all the claims.

In addition, in the foregoing disclosure various features may grouped together in various embodiments for the purpose of streamlining the disclosure. This method of disclosure is not to be interpreted as reflecting an intention that the claimed embodiments require more features than are expressly recited in each claim. Inventive subject matter can lie in less than all features of a single disclosed embodiment.

The abstract of the disclosure is provided to allow the reader to quickly ascertain the nature of the technical disclosure. It is submitted with the understanding that it will not be used to interpret or limit the scope or meaning of the claims.

It will be appreciated that the practice of some jurisdictions may require deletion of one or more portions of the disclosure after that application is filed. Accordingly the reader should consult the application as filed for the original content of the disclosure. Any deletion of content of the disclosure should not be construed as a disclaimer, forfeiture or dedication to the public of any subject matter of the application as originally filed.

The following claims are hereby incorporated into the disclosure, with each claim standing on its own as a separately claimed subject matter.

Although the description herein contains many details, these should not be construed as limiting the scope of the disclosure but as merely providing illustrations of some of the presently preferred embodiments. Therefore, it will be appreciated that the scope of the disclosure fully encompasses other embodiments which may become obvious to those skilled in the art.

All structural and functional equivalents to the elements of the disclosed embodiments that are known to those of ordinary skill in the art are expressly incorporated herein by reference and are intended to be encompassed by the present claims. Furthermore, no element, component, or method step in the present disclosure is intended to be dedicated to the public regardless of whether the element, component, or method step is explicitly recited in the claims. No claim element herein is to be construed as a "means plus function" element unless the element is expressly recited using the phrase "means for". No claim element herein is to be construed as a "step plus function" element unless the element is expressly recited using the phrase "step for".

What is claimed is:

1. An apparatus for dispensing bags and storing waste for disposal, the apparatus comprising:
   a first, expandable, container;
   a second container coupled to the first container by a hinge, wherein said second container functions as a cover for the first container;
   wherein said second container can be moved between a first position and a second position;
   wherein when said second container is in said first position said first container is covered and closed by said second container and there are no openings between said first container and said second container;
   wherein when said second container is in said second position said first container is open;
   a magnetic closure coupling said first container and said second container and configured for retaining said first container and said second container in a closed position;
   an opening in a sidewall of the second container;
   a compartment in the second container configured to retain a perforated roll of bags;
   a lid configured to snap on and off of the second container for opening and closing the second container to provide access to the compartment in said second container;
   wherein the opening in the sidewall of the second container is slotted to allow individual bags in the perforated roll of bags to be threaded through the slotted opening in the sidewall of the second container and then separated from the perforated roll of bags for dispensing, while engaging the next bag to be dispensed in the slotted opening;
   wherein said first container is reconfigurable between a collapsed position and an expanded position; and
   wherein said expanded position of said first container is configured to hold one or more of said bags filled with a material for later disposal.

2. The apparatus of claim 1, wherein said first container comprises a flexible material of sufficient resiliency to withstand collapsing and expanding the first container through numerous duty cycles.

3. The apparatus of claim 2, wherein said flexible material comprises a synthetic or natural polymeric material.

4. The apparatus of claim 3, wherein said polymeric material is selected from the group of polymeric materials consisting of elastomeric materials, latex, silicon, thermoplastics, and rubber.

5. The apparatus of claim 1, wherein said first container comprises multiple sections that form an accordion-like expandable and collapsible structure.

6. The apparatus of claim 1, wherein said first container includes a retention ring having at least one hinge for coupling to at least one hinge on the second container.

7. The apparatus of claim 6, wherein said retention ring includes a ring tab configured for engaging a removable fastener for attaching said apparatus to an object when carrying said apparatus.

8. The apparatus of claim 1, wherein said second container includes a second compartment configured for storing an object.

9. An apparatus for dispensing bags and storing waste for disposal, the apparatus comprising:
   a bag dispenser;
   a waste container coupled to said bag dispenser;
   wherein said bag dispenser functions as a cover for the waste container;
   wherein said bag dispenser can be moved between a first position and a second position;
   wherein when said bag dispenser is in said first position said waste container is covered and closed by said bag dispenser and there are no openings between said bag dispenser and said waste container;
   wherein when said bag dispenser is in said second position said waste container is open;
   an opening in a sidewall of the bag dispenser;
   a compartment in the bag dispenser configured to retain a perforated roll of bags;
   wherein the opening in the sidewall of the bag dispenser is slotted to allow individual bags in the perforated roll of bags to be threaded through the slotted opening in the sidewall of the bag dispenser and then separated from the perforated roll of bags for dispensing, while engaging the next bag to be dispensed in the slotted opening;
   wherein said waste container is reconfigurable between a collapsed position and an expanded position; and
   wherein said expanded position of said waste container is configured to hold one or more of said bags filled with a material for later disposal.

10. The apparatus of claim 9, wherein said waste container comprises a flexible material of sufficient resiliency to withstand collapsing and expanding the first container through numerous duty cycles.

11. The apparatus of claim 10, wherein said flexible material comprises a synthetic or natural polymeric material.

12. The apparatus of claim 11, wherein said polymeric material is selected from the group of polymeric materials consisting of elastomeric materials, latex, silicon, thermoplastics, and rubber.

13. The apparatus of claim 9, further comprising a magnetic closure coupling said bag dispenser and said waste container and configured for retaining said bag dispenser and said waste container in a closed position.

14. The apparatus of claim 9, wherein said waste container comprises multiple sections that form an accordion-like expandable and collapsible structure.

15. The apparatus of claim 9, wherein said waste container includes a retention ring having at least one hinge for coupling to at least one hinge on the bag dispenser.

16. The apparatus of claim 15, wherein said retention ring includes a ring tab configured for engaging a removable fastener for attaching said apparatus to an object when carrying said apparatus.

17. The apparatus of claim 9, further comprising a lid configured to snap on and off of the bag dispenser for opening and closing the bag dispenser.

18. The apparatus of claim 9, wherein said bag dispenser container includes a second compartment configured for storing an object.

19. An apparatus for dispensing bags and storing waste for disposal, the apparatus comprising:
   a first, expandable, container;
   a second container coupled to the first container by a hinge, wherein said second container functions as a cover for the first container;
   wherein said second container can be moved between a first position and a second position;
   wherein when said second container is in said first position said first container is covered and closed by said second container and there are no openings between said first container and said second container;
   wherein when said second container is in said second position said first container is open;
   a magnetic closure coupling said first container and said second container and configured for retaining said first container and said second container in a closed position;
   an opening in a sidewall of the second container;
   a first compartment in the second container configured to retain a perforated roll of bags;
   a second compartment in the second container configured for storing an object;
   a lid configured to snap on and off of the second container for opening and closing the second container to provide access to the first and second compartments in said second container;
   wherein the opening in the sidewall of the second container is slotted to allow individual bags in the perforated roll of bags to be threaded through the slotted opening in the sidewall of the second container and then separated from the perforated roll of bags for dispensing, while engaging the next bag to be dispensed in the slotted opening;
   wherein said first container is reconfigurable between a collapsed position and an expanded position;
   wherein said first container comprises multiple sections that form an accordion-like expandable and collapsible structure;
   wherein said expanded position of said first container is configured to hold one or more of said bags filled with a material for later disposal;
   wherein said first container includes a retention ring having at least one hinge for coupling to at least one hinge on the second container; and
   wherein said retention ring includes a ring tab configured for engaging a removable fastener for attaching said apparatus to an object when carrying said apparatus.

* * * * *